US011825809B2

(12) United States Patent
Wilson

(10) Patent No.: US 11,825,809 B2
(45) Date of Patent: Nov. 28, 2023

(54) DUAL-PURPOSE CONTAINER AND DIVERSION DEVICE FOR ANIMALS AND A METHOD FOR ITS MANUFACTURE

(71) Applicant: Catastrophic Creations, LLC, Byron Center, MI (US)

(72) Inventor: Michael Wilson, Byron Center, MI (US)

(73) Assignee: Catastrophic Creations, LLC, Byron Center, MI (US)

(*) Notice: Subject to any disclaimer, the term of this patent is extended or adjusted under 35 U.S.C. 154(b) by 99 days.

(21) Appl. No.: 17/369,143

(22) Filed: Jul. 7, 2021

(65) Prior Publication Data

US 2021/0329883 A1 Oct. 28, 2021

Related U.S. Application Data

(63) Continuation of application No. 16/386,478, filed on Apr. 17, 2019, now Pat. No. 11,071,276, which is a continuation of application No. 15/861,396, filed on Jan. 3, 2018, now Pat. No. 10,334,816.

(51) Int. Cl.
| | |
|---|---|
| *A01K 1/01* | (2006.01) |
| *A01K 1/02* | (2006.01) |
| *A01K 15/02* | (2006.01) |
| *A01K 1/00* | (2006.01) |
| *A01K 1/03* | (2006.01) |

(52) U.S. Cl.
CPC .......... *A01K 1/0125* (2013.01); *A01K 1/0236* (2013.01); *A01K 1/0035* (2013.01); *A01K 1/033* (2013.01); *A01K 15/02* (2013.01)

(58) Field of Classification Search
CPC ............................ A01K 1/0125; A01K 1/0236
See application file for complete search history.

(56) References Cited

U.S. PATENT DOCUMENTS

| 4,391,223 A | * | 7/1983 | Holland | .................. | A01K 1/033 |
| | | | | | 229/196 |
| 4,520,758 A | * | 6/1985 | Pfriender | ............... | A01K 1/033 |
| | | | | | 119/499 |
| 4,628,863 A | * | 12/1986 | Eichenauer | .......... | A01K 1/0125 |
| | | | | | 119/168 |
| 5,014,649 A | * | 5/1991 | Taft | ...................... | A01K 1/0125 |
| | | | | | 119/168 |

(Continued)

*Primary Examiner* — Jessica B Wong
(74) *Attorney, Agent, or Firm* — CALDWELL INTELLECTUAL PROPERTY LAW

(57) ABSTRACT

A dual-purpose container and diversion device for animals includes a base and a perimeter wall attached to the base. An inner surface and outer surface of the container combine to form an overall surface. The device includes at least a linear fault region in the overall surface having a lesser tensile strength and including at least a first non-intersecting open curve forming a first planar section; the at least a linear fault region may include at least a second curve defining a bracing component. The device is convertible to a second configuration forming a diversion device for an animal, by fracture of the at least a linear fault region to form at least a first flap and rotation of the at least a flap into a second position; conversion may include movement of the at least a bracing component to support the at least a flap in the second position.

15 Claims, 10 Drawing Sheets

(56) References Cited

U.S. PATENT DOCUMENTS

| | | | | |
|---|---|---|---|---|
| 5,078,099 A | * | 1/1992 | Balson | A01K 1/0125 229/125 |
| 5,320,065 A | * | 6/1994 | Leopold | A01K 1/035 229/120.32 |
| 5,572,951 A | * | 11/1996 | Evans | A01K 1/0125 119/168 |
| 5,832,869 A | * | 11/1998 | Franczak | A01K 1/0107 119/168 |
| 10,334,816 B1 | * | 7/2019 | Wilson | A01K 1/0125 |
| 11,071,276 B2 | * | 7/2021 | Wilson | A01K 1/0125 |

* cited by examiner

Providing a Dual-purpose Container in a First Configuration, the Dual-purpose Container Including a Base Having a Perimeter, a Lower Surface And An Upper Surface, and a Sidewall Having a Lower Edge, an Interior Surface, and an Exterior Surface, the Exterior Surface, Interior Surface, Upper Surface, and Lower Surface Together Forming an Overall Surface
705

Defining at Least a First Linear Fault Region in the Overall Surface, Wherein Each First Linear Fault Region of the at Least a First Linear Fault Region Defines a Curve on the Overall Surface and a First Mating Feature
710

Defining a Second Mating Feature on the Overall Surface
715

FIG. 7

DUAL-PURPOSE CONTAINER AND DIVERSION DEVICE FOR ANIMALS AND A METHOD FOR ITS MANUFACTURE

RELATED APPLICATION DATA

This application is a continuation of U.S. Nonprovisional patent application Ser. No. 16/386,478, filed on Apr. 17, 2019, and titled "dual-purpose container and diversion device for animals and a method for its manufacture," which is a continuation of U.S. Nonprovisional patent application Ser. No. 15/861,396, filed on Jan. 3, 2018, and titled "DUAL-PURPOSE CONTAINER AND DIVERSION DEVICE FOR ANIMALS AND A METHOD FOR ITS MANUFACTURE," the entirety of which is incorporated herein by reference.

FIELD OF THE INVENTION

The present invention generally relates to the field of diversion products for pets. In particular, the present invention is directed to dual-purpose container and diversion device for animals and a method for its manufacture.

BACKGROUND

The health and well-being of domestic animals often depends on their access to exercise and entertainment. For many pets, both of these goals can be aided by presenting opportunities for play; dogs, for instance, are known to enjoy having balls thrown to them, and cats like to stalk and pounce on strings or other objects dragged along the floor. One particularly notable source of entertainment for animals involves climbing into and onto structures, enclosures, and the like. Doll-houses and similar constructions are sometimes provided to animals for this purpose. Likewise, many animals need hiding places for emotional well-being, and have been known to take advantage of such structures for that reason. However, dollhouses for animals can be expensive and take up space and suffer from attrition with lengthy use. As a result, they can be infeasible for many pet owners.

SUMMARY OF THE DISCLOSURE

In one aspect, a dual-purpose container and diversion device for animals is disclosed. Dual-purpose device includes a base having a perimeter, a lower surface and an upper surface, the base having a first tensile strength. Dual-purpose device includes a sidewall having a lower edge, and interior surface, and an exterior surface. Sidewall has a second tensile strength. The lower edge is attached to the perimeter of the base. The lower surface of the base and exterior surface of the sidewall combine to define an outer surface of the dual-purpose device. The upper surface of the base and the interior surface of the sidewall combine to form an inner surface of the dual-purpose device. The inner surface and the outer surface combine to form an overall surface of the dual-purpose device. Dual-purpose device includes at least a first linear fault region in the overall surface; each first linear fault region of the at least a first linear fault region defines a first curve on the overall surface. The first linear fault region defines a first mating feature. The first linear fault region has a third tensile strength. The third tensile strength is less than each of the first tensile strength and the second tensile strength. The dual-purpose device further includes a second mating feature defined in the overall surface. The dual-purpose device is convertible from a first configuration to a second configuration. The interior surface of the sidewall and upper surface of the base form an inner surface defining an interior compartment of the device in the first configuration. The device is transformed to a second configuration by fracture of the at least a linear fault region and joining of the first mating feature and second mating feature.

In another aspect, a dual-purpose container and diversion device for animals is disclosed. Dual-purpose device includes a base having a perimeter, a lower surface and an upper surface, the base having a first tensile strength. Dual purpose device includes a sidewall having a lower edge, and interior surface, and an exterior surface. Sidewall has a second tensile strength. The lower edge is attached to the perimeter of the base. The lower surface of the base and exterior surface of the sidewall combine to define an outer surface of the dual-purpose device. The upper surface of the base and the interior surface of the sidewall combine to form an inner surface of the dual-purpose device. The inner surface and the outer surface combine to form an overall surface of the dual-purpose device. Dual-purpose device includes at least a first linear fault region in the overall surface, wherein each first linear fault region of the at least a first linear fault region defines a first non-intersecting open curve on the overall surface. The first linear fault region has a third tensile strength. The third tensile strength is less than each of the first tensile strength and the second tensile strength. The first non-intersecting open curve includes a first extremum and a second extremum. The first extremum and second extremum define a first linear section of the outer surface that is not a part of the at least a linear fault region. Dual-purpose device is convertible from a first configuration to a second configuration, where the interior surface of the sidewall and upper surface of the base form an inner surface defining an interior compartment of the device in the first configuration and the device may be transformed to a second configuration by fracture of the at least a linear fault region and deformation of the outer surface along the linear section of each at least a linear fault region to evert at least a planar section of the inner surface the at least a planar section opposite a corresponding at least a planar section of the outer surface.

In another aspect, a method of manufacturing a dual-purpose device is disclosed. The method includes providing a container in a first configuration, the container including a base having a perimeter, a lower surface and an upper surface, wherein the base has a first tensile strength, and a sidewall having a lower edge, and interior surface, and an exterior surface, wherein the sidewall has a second tensile strength, the exterior surface, interior surface, upper surface, and lower surface together forming an overall surface. The method includes defining at least a first linear fault region in the overall surface, wherein each first linear fault region of the at least a first linear fault region defines a curve on the overall surface. The first linear fault region has a third tensile strength. The third tensile strength is less than the first tensile strength and the second tensile strength These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention.

However, it should be understood that the present invention is not limited to the precise arrangements and instrumentalities shown in the drawings, wherein:

FIG. 7 is an exemplary flow diagram of a method for manufacturing a dual-purpose device in an embodiment.

DETAILED DESCRIPTION

In an embodiment, this disclosure presents a dual-purpose product that may be converted from a container, such as a container for shipping materials, to a diversionary device for pets, such as cats. Detachment of sections of surfaces, and deformation of one or more surfaces of the product in its container form, may convert it into an item of pet furniture, an enclosure or hiding spot for pets, or a play-station offering various features of a diversionary nature for one or more categories of domestic animal. Linear fault regions defined on an exterior surface of the product in its container-oriented form may direct a user's conversion into a diversionary product by defining breakaway sections and axes of transformation. The use of the dual-purpose product saves resources and grants users greater flexibility in arranging living spaces for their pets.

Figure 1A:
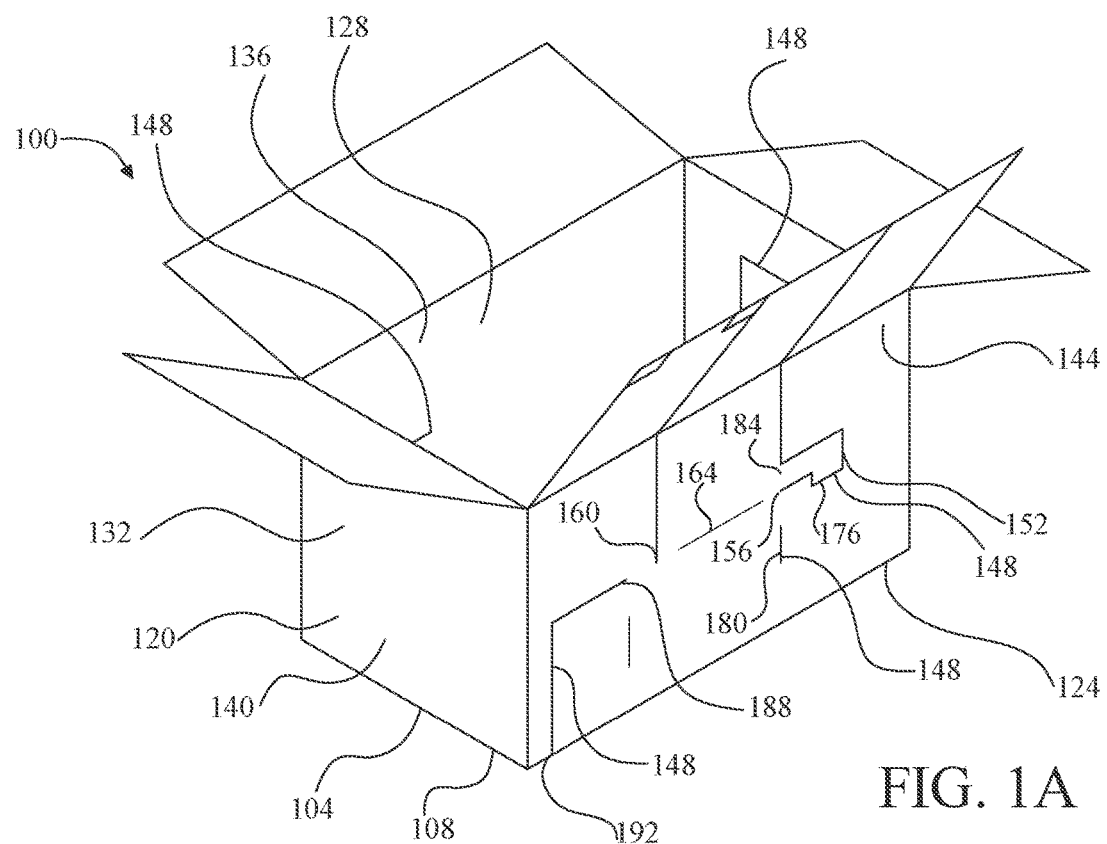
FIGS. 1A-C present an exemplary set of isometric views of a dual-purpose device in an embodiment.
Figure 1B:
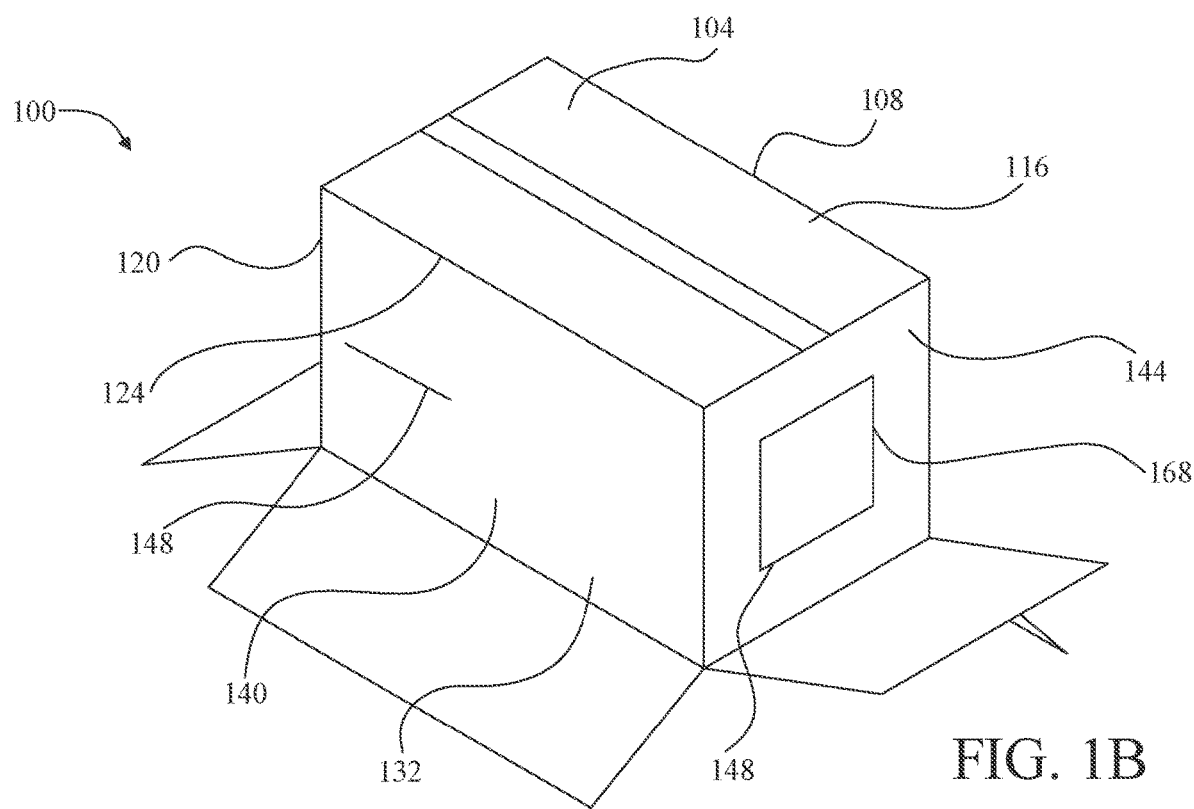
Figure 1C:
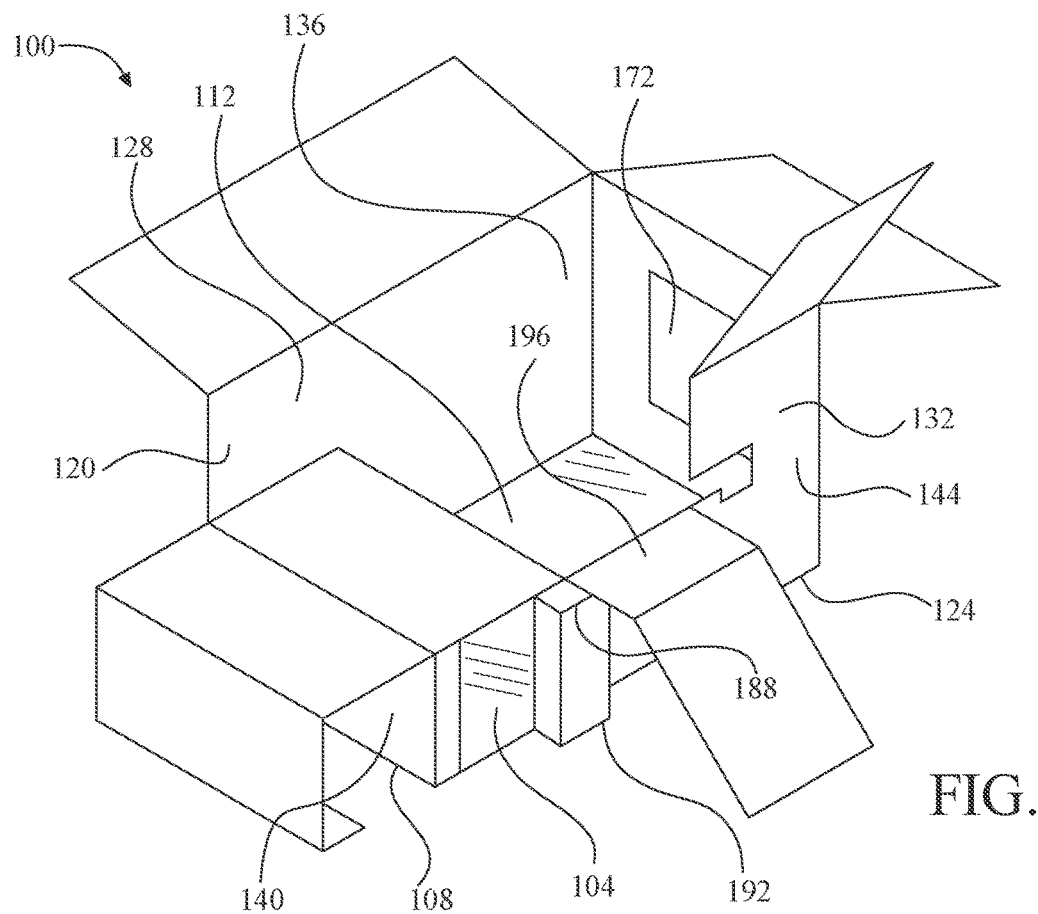

Turning now to FIGS. 1A-C, an exemplary embodiment of a dual-purpose container and diversion device for animals 100 is illustrated. Dual-purpose device 100 includes a base 104 having a perimeter 108. Perimeter 108 may have any suitable form for a container as described herein, including any regular or irregular polygonal or substantially polygonal form, such as a rectangular form, any curved form, or any combination of polygonal or curved forms, including without limitation concave and convex curves or polygonal forms and combinations thereof. Base 104 includes an upper surface 112. Base 104 includes a lower surface 116, which may be a surface that rests on supporting surfaces such as without limitation floors, shelves, or countertops when dual-purpose device 100 is being used as a container, as described in further detail below. Base 104 may be flat or substantially flat; for instance, the base 104 may be formed of a substantially planar sheet of material, or of two or more sheets or flaps of material joined at or near edges using joining means such as tape, glue, staples, or the like. Such a substantially flat base 104 as used herein may, as a non-limiting example, form the base of a typical cardboard box for transporting books, food, or other items; where flaps bend from sides of the box to join beneath, there may be a slight curvature and, where flaps overlap or present a gap between edges as joined, slight irregularities may result; such irregularities do not prevent base 104 from being substantially flat as the term is used herein.

Still referring to FIGS. 1A-C, base 104 may be made of any suitable material or combination of materials, including without limitation wood, natural or artificial polymers, natural or artificial textile materials, materials created by molding or otherwise joining fibers including without limitation paper or fiberboard, metals, composite materials such as fiberglass, or any combination thereof. Materials may be joined together in any suitable configuration to form base 104, including without limitation corrugation, in which at least one sheet of material or materials is fluted or pleated to create a series of ridges and troughs that enhance the strength of the sheet; a corrugated sheet may be adhered to one or more flat sheets of the same or different materials, or may be sandwiched between two sheets, as is commonly seen in "corrugated cardboard," boxboard, plastic shipping materials, and the like. It should be noted that in some embodiments, all or a majority of dual-purpose device 100 is made from the same material; for instance, substantially all of dual-purpose device 100 may be created by producing a sheet of material, cutting the sheet to form a set of flaps, and then joining edges of the flaps in a prescribed order to form a box or similar container. Further examples for variation and/or modification of materials making up base 104 and/or device 100 are set forth in further detail below.

Continuing to refer to FIGS. 1A-C, base 104 has a first tensile strength, where the tensile strength of base 104 is defined as the amount of tension base 104, aside from any linear fault region as described in further detail below, can withstand prior to rupture or tearing; in other words, first tensile strength may be the tensile strength or ultimate tensile strength of base 104 if base 104 has no linear fault region defined thereon, or alternatively of any section of base 104 not containing a linear fault region. First tensile strength may be determined by material or materials making up base 104 and may be selected during manufacture by selection of materials, particularly where materials are graded according to properties including strength.

Still viewing FIGS. 1A-C, dual-purpose device 100 includes a perimeter wall 120. Perimeter wall 120 includes a lower edge 124 attached to perimeter 108. Perimeter wall 120 may have any shape or combination of shapes suitable for use as base 104. Perimeter wall 120 includes an interior surface 128 and an exterior surface 132. Interior surface 128 may join with upper surface 112 at lower edge 124 and perimeter 108; interior surface 128 and upper surface 112 may combine to form an inner surface 136 of dual-purpose device 100. Exterior surface 132 may join with lower surface 116 at lower edge 124 and perimeter 108; exterior surface 123 and lower surface 116 may combine to form an outer surface 140 of dual-purpose device 100. Inner surface 126 and outer surface 140 together may form an overall surface 144 of dual-purpose device 100.

With continued reference to FIGS. 1A-C, perimeter wall 120 may be formed to complement the form of perimeter 108; for instance, lower edge 124 may have a length equal to a length of perimeter 108. Perimeter wall 120 may form one or more sides of a container where dual-mode device 100 is in its first mode; as a non-limiting example introduced for the purposes of illustration, where base 104 has a substantially rectangular form, perimeter wall 120 may be made up of four conjoined substantially rectangular sections. Perimeter wall 120 may be formed by any suitable means, including formation of a sheet of material and attachment of two edges thereof together to create a loop or tube-like structure. Perimeter wall 120 may be constructed of any material or materials suitable for the construction of base; perimeter wall 120 and base 104 may, as a non-limiting example, be formed together in a single process. Perimeter wall 120 may include one or more extensions or flaps extending from perimeter wall 120, which may be foldable to form a top of dual-purpose device 100 when used as a container; alternatively or additionally, a top including an additional sheet or set of sheets attached to upper edges of perimeter wall 120 may be a part of dual-purpose device 100. Perimeter wall 120 has a second tensile strength, which may be defined as described above for first tensile strength. Second tensile strength may be equal or substantially equal to first tensile strength.

Continuing to refer to FIGS. 1A-C, dual-purpose device 100 includes at least a first linear fault region 148 in the overall surface, where "in the overall surface" as used in this disclosure means "in the inner surface, in the outer surface, or both." As used herein, at least a linear fault region 148 is linear when it may be defined geometrically by a linear segment or curve. For example, at least a linear fault region 148 may include one or more line segments. At least a linear fault region 148 may include one or more curves or segments of curves, such as without limitation, a partial or entire perimeter of a circle or ellipse, a partial or entire perimeter of an archway, a partial or entire perimeter of a polygon, a curved line defining a portion of a parabola or other polynomial curve, a curved line forming a "bell curve" or Gaussian curve, a curved line forming a hyperbolic curve, a curved line forming a "curly cue," any combination of the above, or any other finite combination of linear or curved segments definable as one-dimensional parameterized curves in a two-dimensional space. In other words, each first linear fault region of at least a first linear fault region 148 defines a first curve on the outer surface, which may be any line segment, curve segment, or combination thereof as described above. Curves, as used herein, may include portions of exterior edges of perimeter wall 120 contacted by portions of curves.

With continued reference to FIGS. 1A-C, a first linear fault region of at least a first linear fault region 148 may include an open curve 152, defined as a curve having a first endpoint and a second endpoint, where the first endpoint and the second endpoint are not the same. Open curve 152 may be a non-intersecting curve, which may be a curve that does not cross over itself at any point. Open curve 152 may include a first extremum 156 and a second extremum 160 defining a first linear section 164 of the overall surface 144 that is not a part of the at least a first linear fault region 148. As used herein, first extremum 156 and second extremum 160 share a direction, shown in the example as orthogonally downward toward base 104, in which each of first of extremum 156 and second extremum 160 represents the farthest one can travel in the shared direction by proceeding along the curve 152 in at least one direction of traversal; in other words, an extremum may be the farthest you can travel in the direction by traversing a first way on the curve, a second way, or both. An extremum of first extremum 156 and second extremum 160 may be an endpoint but is not necessarily an endpoint. Linear section 164 may be a line on which a flap defined by open curve 152 may be folded in the process of converting dual-purpose device 100 from a first configuration to a second configuration as described in further detail below. Linear section 164 may be positioned in any orientation with respect to dual-purpose device 100; as a non-limiting example, linear section 164 may be parallel to base 104, causing formation of a platform or tray upon deformation along linear section 164, or may be orthogonal to base 104, which may create a structural wall as described in further detail below.

Still viewing FIGS. 1A-C, at least a first linear fault region 148 may alternatively or additionally include a closed curve 168. Closed curve 168 may be a curve having a first endpoint and a second endpoint, where the first endpoint and the second endpoint are identical; closed curve 168 may thus define a removable section of dual-purpose device 100. In other words, closed curve 168 may define an opening 172 that may be formed in dual-purpose device by fracture along closed curve 168, as set forth in further detail below.

Continuing to refer to FIGS. 1A-C, at least a first linear fault region 148 has a third tensile strength, defined in the same way as first tensile strength and second tensile strength. Third tensile strength is less than first tensile strength and second tensile strength. As a result, at least a first linear fault region 148 may form a "breakaway" line which is easier to fracture than the remainder of base 104 and perimeter wall 120. At least a first linear fault region 148 may be formed by any process causing third tensile strength to be less than first tensile strength and second tensile strength. For instance, at least a first linear fault region 148 may be formed by creating perforations along one or more lines defining at least a first linear fault region 148. At least a first linear fault region 148 may be formed by cutting partway through the material of dual-purpose device 100 along one or more lines defining at least a first linear fault region 148. At least a first linear fault region 148 may be formed by scoring the material of dual-purpose device 100 along one or more lines defining at least a first linear fault region 148. At least a first linear fault region 148 may be formed by creasing, or repeatedly creasing, the material of dual-purpose device 100 along one or more lines defining at least a first linear fault region 148. At least a first linear fault region 148 may be formed by forming one or more lines defining at least a first linear fault region 148 of a weaker material than the material used to form base 104 and perimeter wall 120.

Still referring to FIGS. 1A-B, at least a first linear fault region may define a first mating feature 176. As used herein, first mating feature 176 is a feature configured to join with a corresponding second mating feature 180 of overall surface 144. As a non-limiting example, first mating feature 176 may include a tab or tab-like structure, while second mating feature 180 may include a slot or the like; second mating feature may be defined by a second linear fault region, which may, for instance, be fractured to form a slot. First mating feature 176 may be folded along a linear section 164 or may be detached entirely as described above for closed curve to move first mating feature 176 into position to contact second mating feature 180. Joining first mating feature 176 to second mating feature 180 may have the effect of increasing structural strength of dual-purpose device 100 in a second configuration as described in further detail below. Joining first mating feature 176 to second mating feature 180 may have a further effect of providing support to maintain one or more surfaces in a given attitude or to support weight when dual-purpose device 100 is in a second configuration as described in further detail below. First mating feature 176 may be joined to second mating feature 180 by insertion of a tab into a slot. First mating feature 176 may be joined to second mating feature 180 by causing a portion of overall surface 144 to join to first mating feature 176 by friction or opposition to gravity or other forces on overall surface 144; for instance, first mating feature 176 may include a section of edge that is folded into a position where a portion of overall surface 144 representing the second mating feature 180 that is folded down may rest on it, causing gravity and friction to hold the two mating features together.

Continuing to refer to FIGS. 1A-C, dual-purpose device 100 may include at least a bracing component. In an embodiment, at least a bracing component may be a portion of dual-purpose device 100 that in the second configuration is moved to a position in which it transfers force from a portion of dual-purpose device 100 to another portion of dual-purpose device 100 or to a surface on which dual-purpose device rests; the at least a bracing component may provide an avenue of force transfer that did not exist in the first configuration. At least a bracing component may include at least an edge bracing component 184 having a first end connected to an edge and a second end contacting either overall surface 144, another edge, or a surface on which dual-purpose device 100 is resting; at least an edge bracing component 184 may include additional ends, which may also brace against overall surface 144, an edge, or the surface on which the dual-purpose device 100 is resting. Where at least an edge bracing component 184 contacts a point on overall surface, at least an edge bracing component 184 may include a first mating feature 176 that mates with at least a second mating feature 180 at that point, as described in further detail above. At least a bracing component may include at least a surface bracing component 188 having a first end contacting overall surface and a second end contacting overall surface, an edge, or a surface on which dual-purpose device 100 is resting. At least a surface bracing component 188 may include additional ends, which may also brace against overall surface 144, an edge, or the surface on which the dual-purpose device 100 is resting. Where at least a surface bracing component 188 contacts a point on overall surface, at least an edge bracing component 188 may include a first mating feature 176 that mates with at least a second mating feature 180 at that point, as described in further detail above. At least a bracing component may include at least a floor bracing component 192 having a first end contacting a surface on which dual-purpose device is resting 100 and a second end contacting overall surface or an edge. At least a floor bracing component 192 may include additional ends, which may also brace against overall surface 144, an edge, or the surface on which the dual-purpose device 100 is resting. Where at least a floor bracing component 192 contacts a point on overall surface, at least a floor bracing component 192 may include a first mating feature 176 that mates with at least a second mating feature 180 at that point, as described in further detail above. A bracing component of at least a bracing component may be a combination of the above-described categories of bracing components; for instance, a bracing component of at least a bracing component that contacts an edge, overall surface 144 and a surface on which dual-purpose device 100 is resting may be an edge bracing component 184, as well as a surface bracing component 188 and a floor bracing component 192.

Still referring to FIGS. 1A-C, bracing component may be moved into position by deformation about a linear section as described above. As a non-limiting example, dual-purpose device 100 may include a second linear fault region having a fourth tensile strength, where the fourth tensile strength is less than the first tensile strength and the second tensile strength. Second linear fault region may form a complementary linear fault region that defines a non-intersection open curve on the overall surface. Open curve may define a linear section as described above, about which a portion of overall surface may be deformed to rotate second linear fault region; rotation may cause an edge defined by at least a second linear fault region to contact at least one of the at least a planar section of the inner surface and the at least a planar section of the outer surface, as described above. Similarly, deformation along linear section may cause an edge defined by at least a second linear fault region to contact a surface on which the dual-purpose device 100 is resting.

With continued reference to FIGS. 1A-C, dual-purpose device 100 is convertible from a first configuration, as shown in FIGS. 1A-B to a second configuration, as shown in FIG. 1C. In the first configuration inner surface 136 defines an interior compartment of the device in the first configuration; in other words, in first configuration, internal surface 128 and upper surface 112 together define the interior compartment. Interior compartment may be, as a non-limiting example, an interior compartment of a box or similar container for transporting objects. Dual-purpose device 100 may be transformed to second configuration by fracture of the at least a linear fault region. Conversion to second configuration may include fracturing a plurality of linear fault regions, including a plurality of linear fault regions of at least a first linear fault region 148 and/or one or more second linear fault regions as described in further detail herein. Conversion to second configuration may include deformation of overall surface 144 along linear section 164 to evert at least a planar section 196 of inner surface 136; this may also involve moving a corresponding at least a planar section of outer surface 140 opposite planar section 196 in parallel with planar section. Conversion to second configuration may include positioning at least a bracing component to redistribute force. Conversion to second configuration may include joining of at least a first mating feature 176 and at least a second mating feature 180.

Figure 2A:
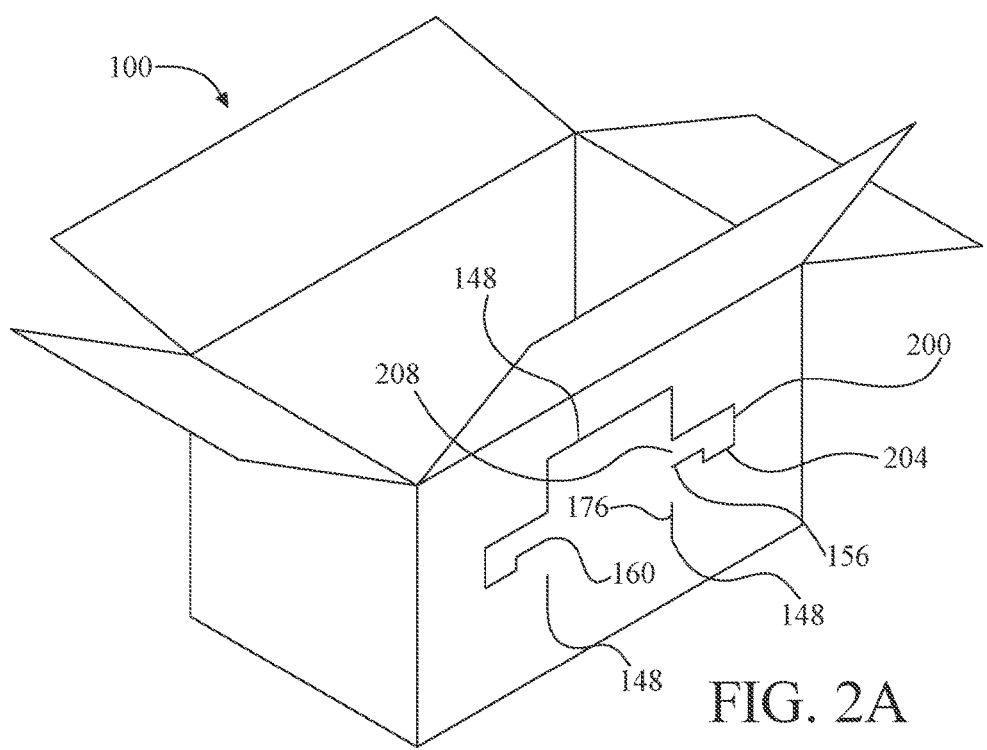
FIGS. 2A-B present an exemplary set of isometric views of a dual-purpose device in an embodiment.
Figure 2B:
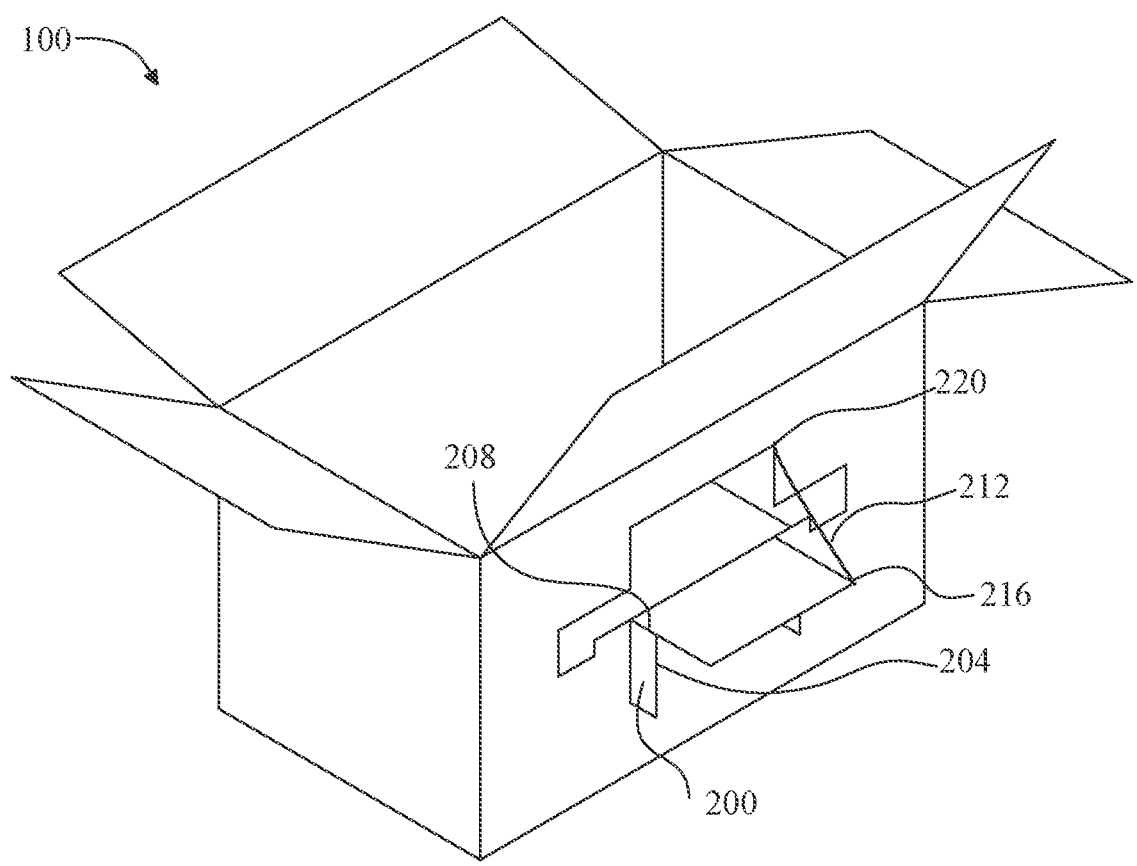

Referring now to FIGS. 2A-B, a view of an exemplary embodiment of dual-purpose device is illustrated. Where a fault region of the at least a first linear fault region 148 includes a first extremum 156 and a second extremum 160 defining a linear section 164 which may be deformed to convert to second configuration, the fault region may additionally include an extension 200 of the curve from the first extremum and away from the second extremum; in other words, extension 200 may curve "outward" away from the linear section 164. Extension 200 may define an edge 204. Deformation of overall surface 144 to rotate edge 204 about an axis 208 that differs from at least a linear section 164 may cause the edge 204 to contact overall surface 144 when dual-purpose device 100 is in second configuration; in an embodiment, extension 200 thus creates an edge brace 184. Extension 200 additionally or alternatively creates a surface brace 188. Extension 200 may include a first mating feature 176, which may be any first mating feature as described above. Overall surface 144 may include a second mating feature 180 that joins with first mating feature 176 when dual-purpose device 100 is in second configuration. At dual-purpose device 100 may include at least a ligature 212. At least a first linear fault region may define a first attachment feature 216, which may include, as a non-limiting example, an aperture through which ligature 212 may be threaded; ligature 212 may attach to first attachment feature 216. At least a first linear fault region may define a second attachment feature 220, which may include, as a non-limiting example, an aperture through which ligature 212 may be threaded; ligature 212 may attach to first attachment feature 220.

Figure 3A:
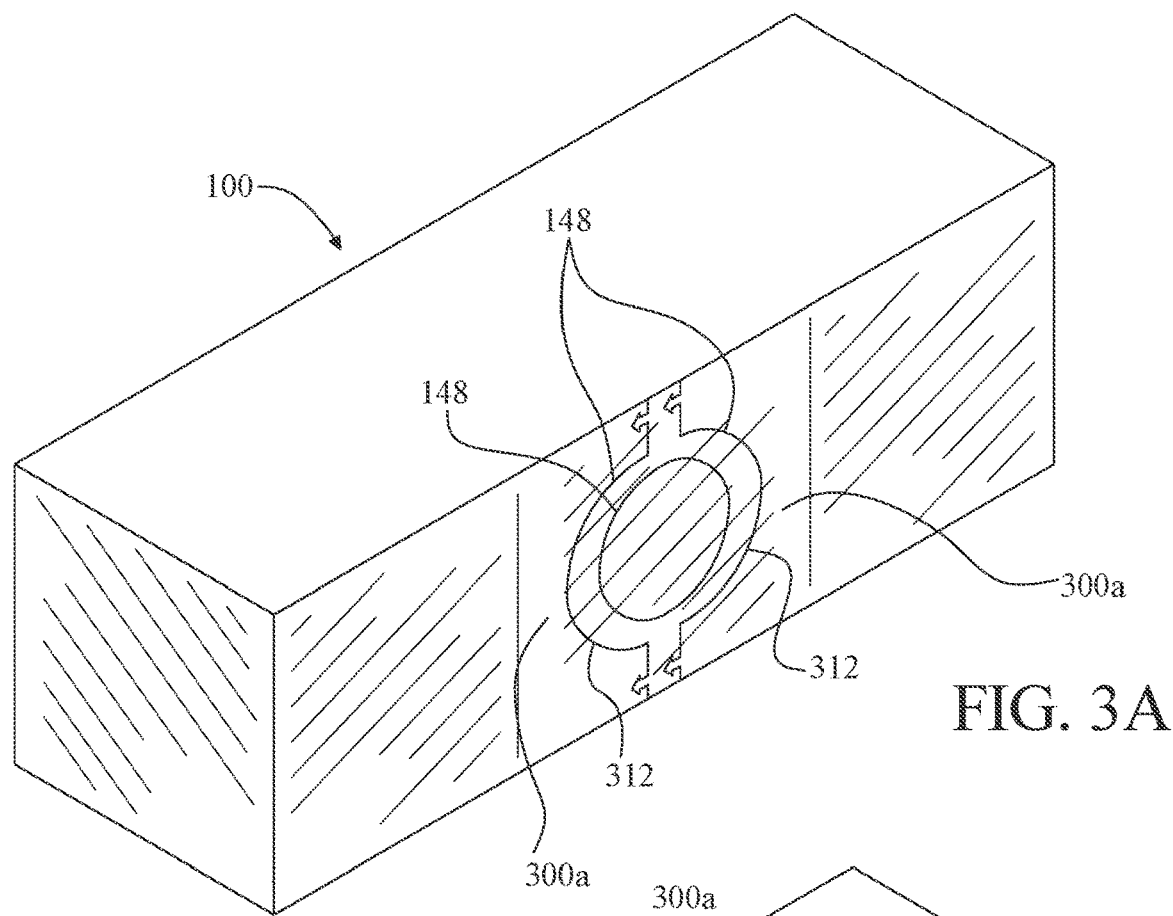
FIGS. 3A-C present an exemplary set of isometric views of a dual-purpose device in an embodiment.
Figure 3B:
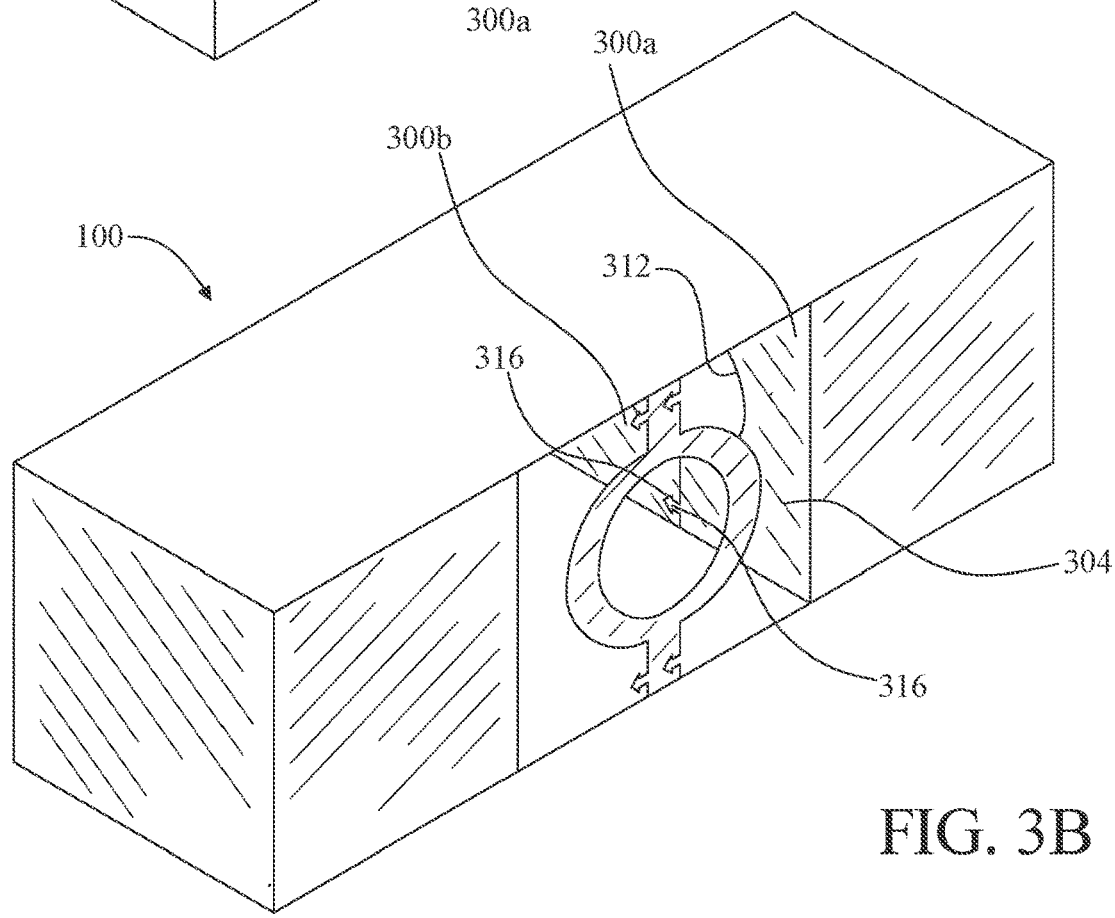
Figure 3C:
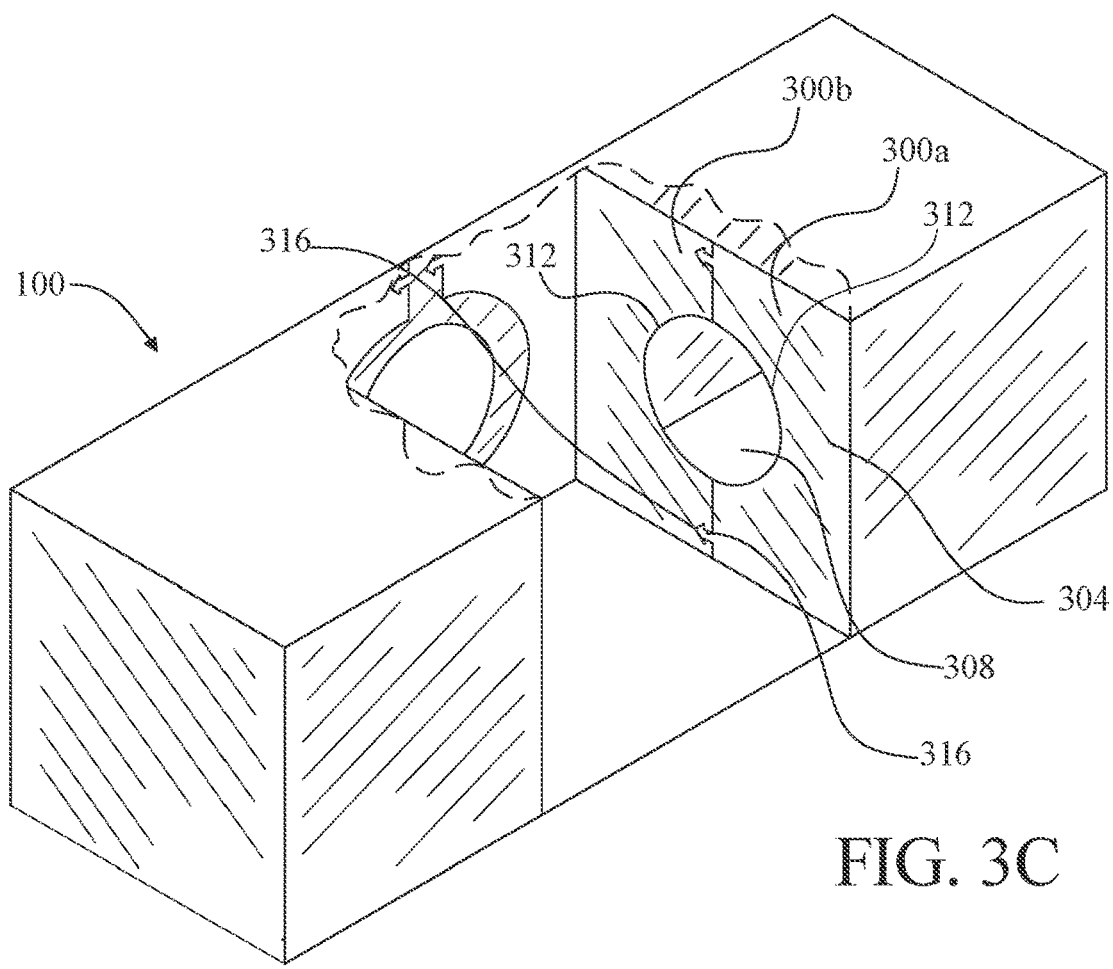

Referring now to FIGS. 3A-C, an exemplary embodiment of a dual-purpose device 100 is illustrated. At least a first linear fault region 148 may define at least a wall section 300; at least a wall section may rotate, when dual-purpose device 100 is in second configuration, to form a structural wall 304. Structural wall 304 may be formed within compartment of first configuration or may be formed to the exterior; for instance, structural wall 304 may extend the compartment outward, forming at least a partial additional chamber. Structural wall 304, where internal to compartment, may subdivide compartment into two or more rooms; for instance, as illustrated in FIGS. 3A-C, the structural wall 304 may subdivide the compartment into three rooms. Persons skilled in the art, upon reading the entirety of this disclosure, will be aware of many possible subdivisions and/or extensions that may be formed using structural wall 304. Structural wall 304 may include an opening 308. Opening 308 may be defined by a second linear fault region, or by first linear fault region; for instance, and as illustrated for exemplary purposes in FIGS. 3A-C, at least a first linear fault region 148 may define an opening by means of a concave curve 312 at an edge of a flap defined by at least a first linear fault region; two such concave curves 312 may combine to form opening 308 where two flaps join at edges to define structural wall 304. At least a first linear fault region may include one or more mating features 316, which may be any mating feature as described above. In an embodiment, structural wall 304 is formed in second configuration by rotating two flaps toward each other and joining one flap to another flap using at least a mating feature 316.

Figure 4A:
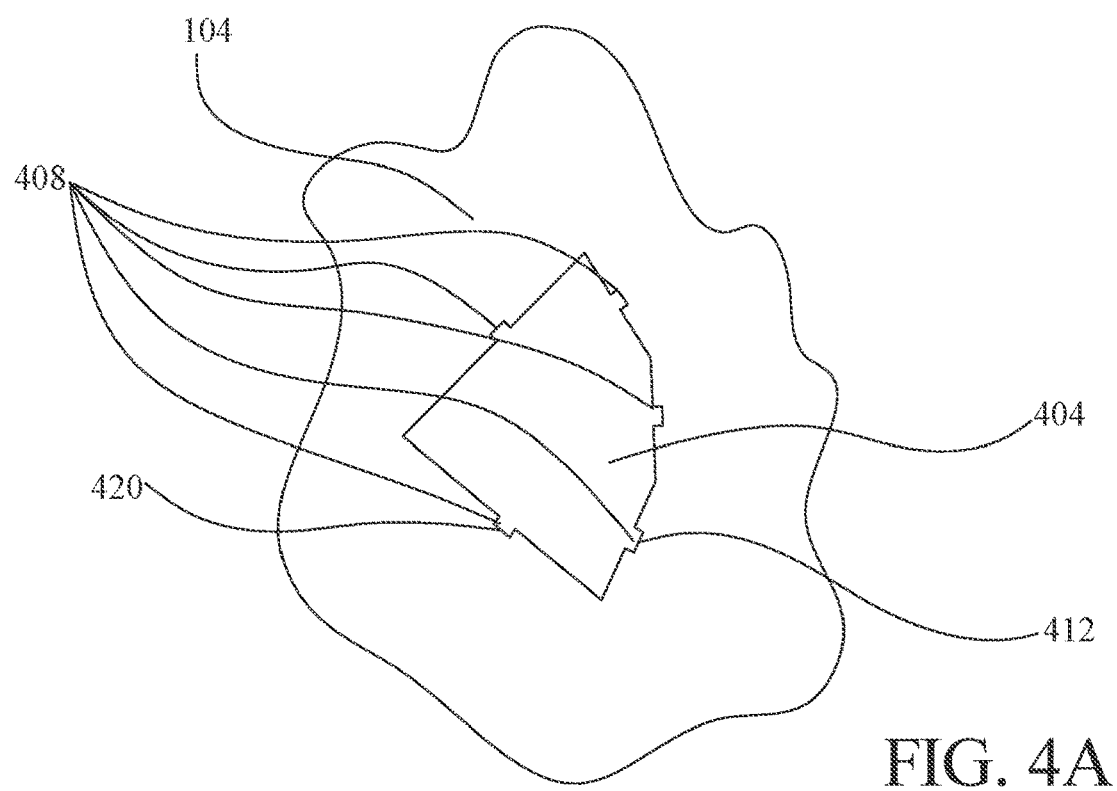
FIGS. 4A-D present an exemplary set of schematic views of a bracing component in an embodiment.
Figure 4B:
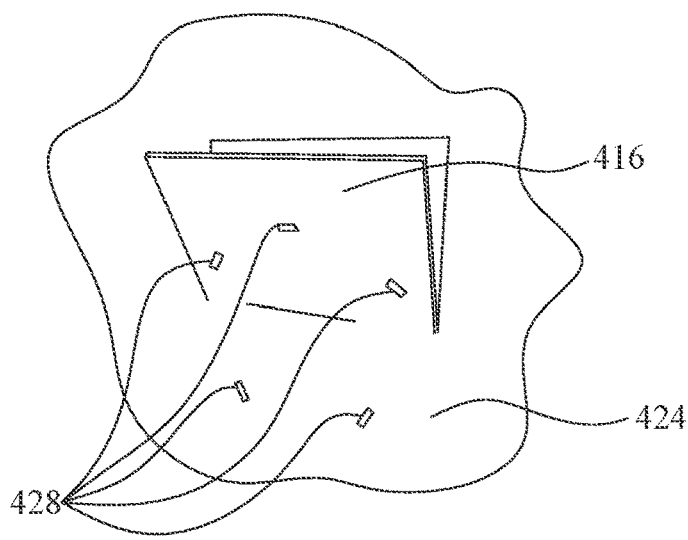
Figure 4C:
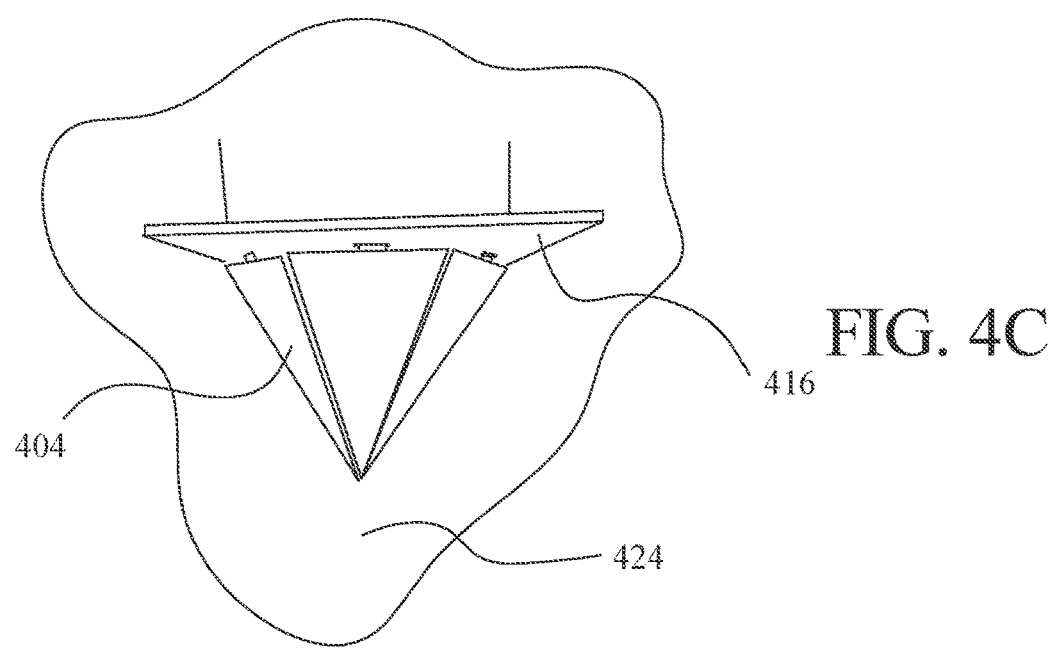
Figure 4D:
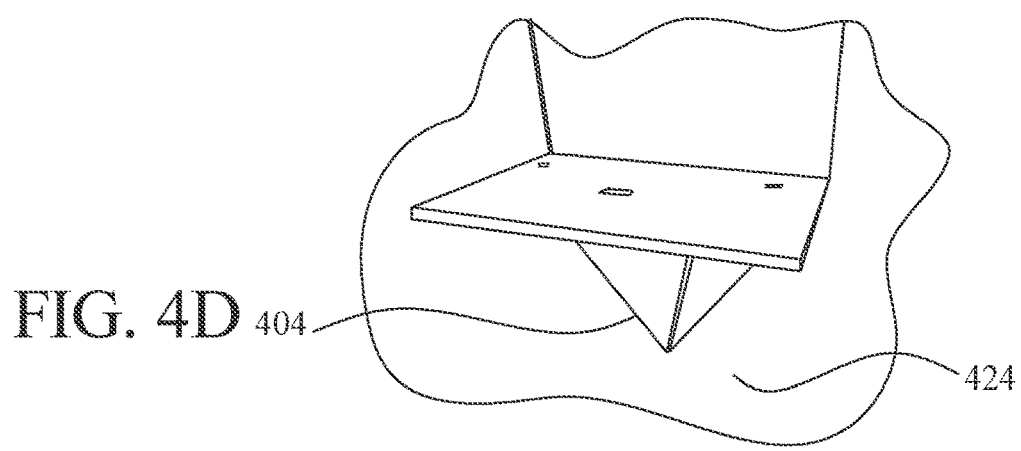

Turning now to FIGS. 4A-D, an embodiment of at least a second linear fault region 400 forming a brace is illustrated. At least a second linear fault region 400 may be defined in a surface of overall surface; in an embodiment, at least a second linear fault region 400 may be defined in base 104. At least a second linear fault region may define a bracing component 404, which may be any bracing component as described above in reference to FIGS. 1A-C; in an embodiment, at least a second linear fault region may define a closed curve, such that bracing component 404 may be detached by fracture of at least a second linear fault region 400. Bracing component 404 may include at least a first mating feature 408, which may be any mating feature as described above; at least a first mating feature 408 may include at least a mating feature 412 positioned to join with a first portion 416 of overall surface 144 and at least a mating feature 420 positioned to join with a second portion 424 of overall surface. As a nonlimiting example, first portion 416 may be rotated by deforming a linear section of overall surface in second configuration. First portion 416 and second portion 424 may include at least a second mating feature 428, which may be any mating feature as described above. Bracing component 404 may be folded into a non-planar shape; in an embodiment, folding into a non-planar shape enables bracing component 404 to have greater structural strength. Bracing component 404 may be deployed by joining at least a mating first mating feature 408 with at least a second mating feature 428, for instance as illustrated in FIGS. 4C-D. In an embodiment, bracing component 404 enables a portion of overall surface 144 to be deployed as a tray or balcony having sufficient structural strength to support an animal or an object that an animal plays with.

Figure 5A:
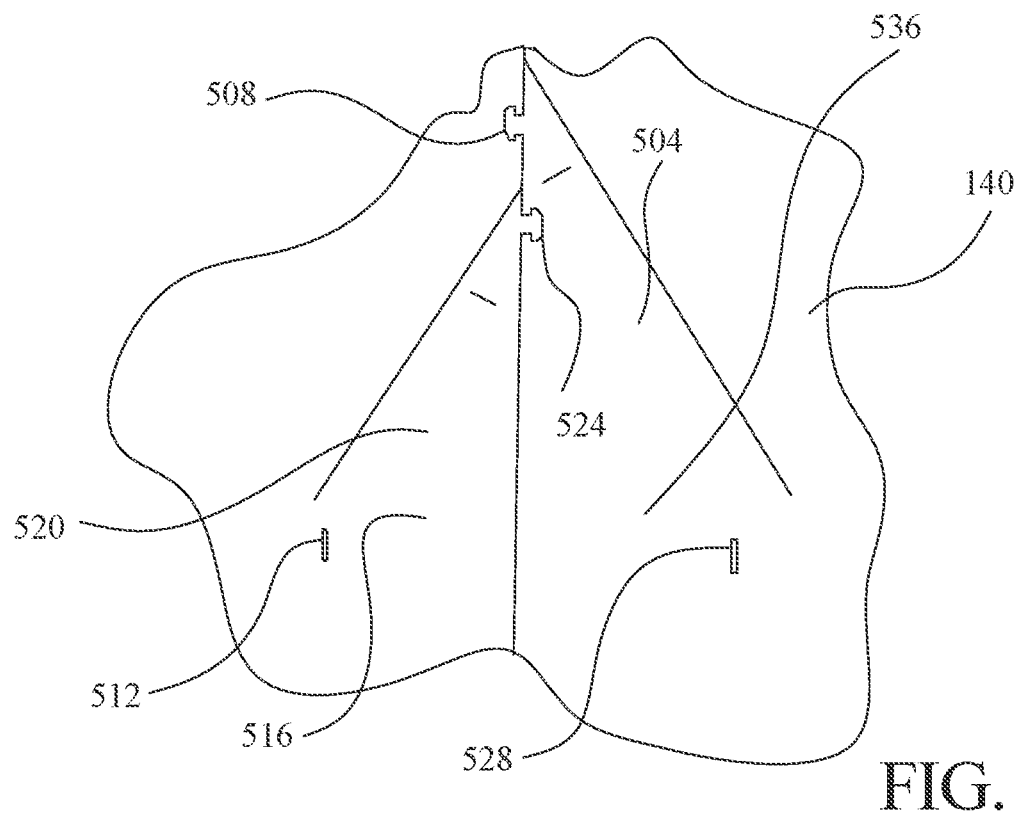
FIGS. 5A-C present an exemplary set of schematic views of a double-layered planar structure in an embodiment.
Figure 5B:
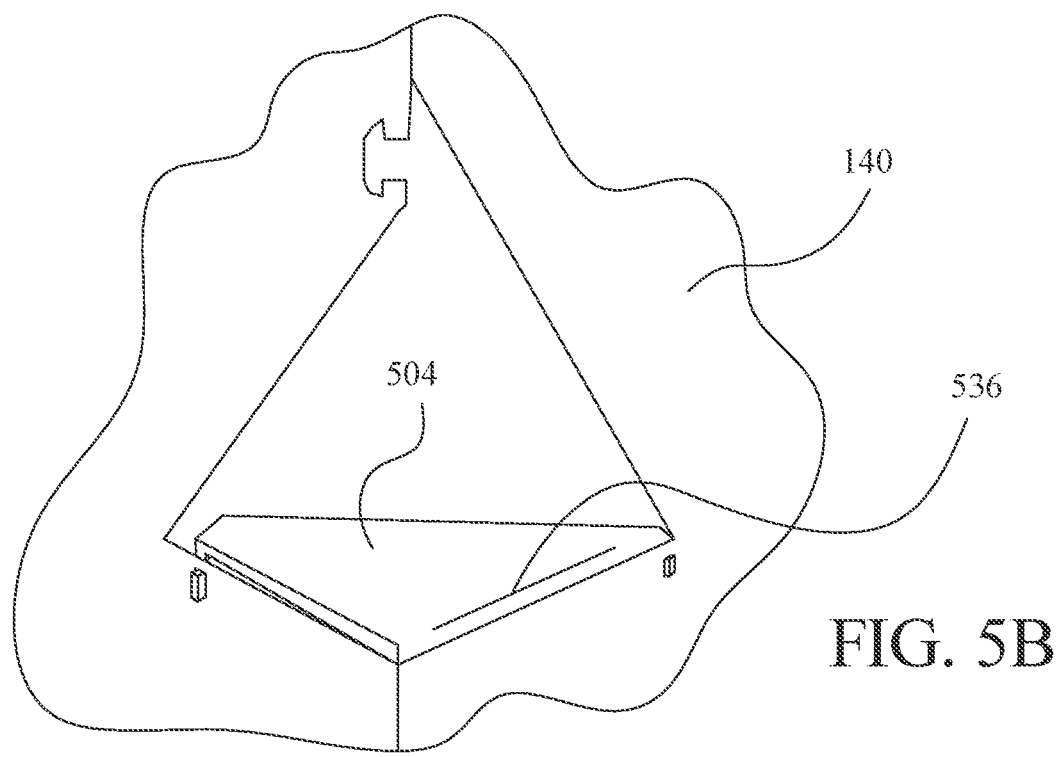
Figure 5C:
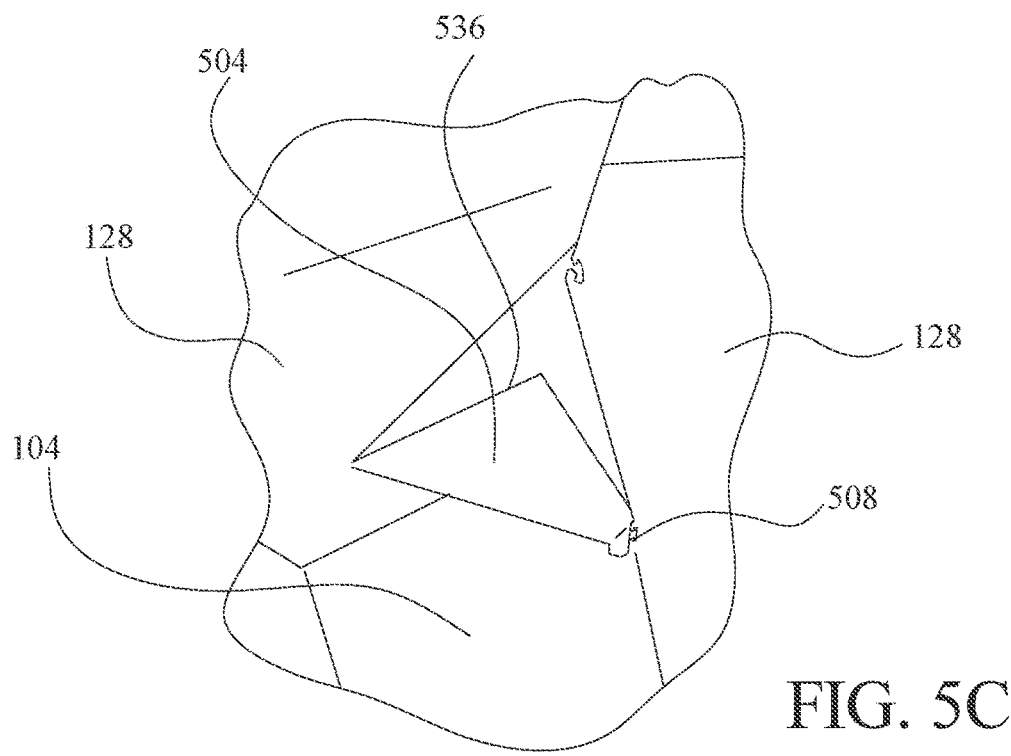

Turning now to FIGS. 5A-C, at least a first linear fault region 148 may define two flaps that join to form a double layer. For instance, a first flap 504 may have a first mating feature 508 that joins a second mating feature 512 placed at or near a linear section 516 about which a second flap 520 rotates to convert dual-purpose device 100 from first configuration to second configuration. Second flap 520 may have a third mating feature 524 that joins a fourth mating feature 528 placed at or near a linear section 536 about which first flap 504 rotates; as a result, in second configuration, where first mating feature 508 is joined to second mating feature 512 and third mating feature 524 is joined to fourth mating feature 528, first flap 504 and second flap 520 may form a double-layered planar feature such as a platform, tray, bracing component, or structural wall, as illustrated for instance in FIGS. 5B-C. Double-layered planar feature may be located in a corner, as shown, may join two walls of dual-purpose device together, or may extend from one as a ramp or platform supported on floor-bracing components, for instance as described above in reference to FIGS. 1A-C.

Figure 6A:
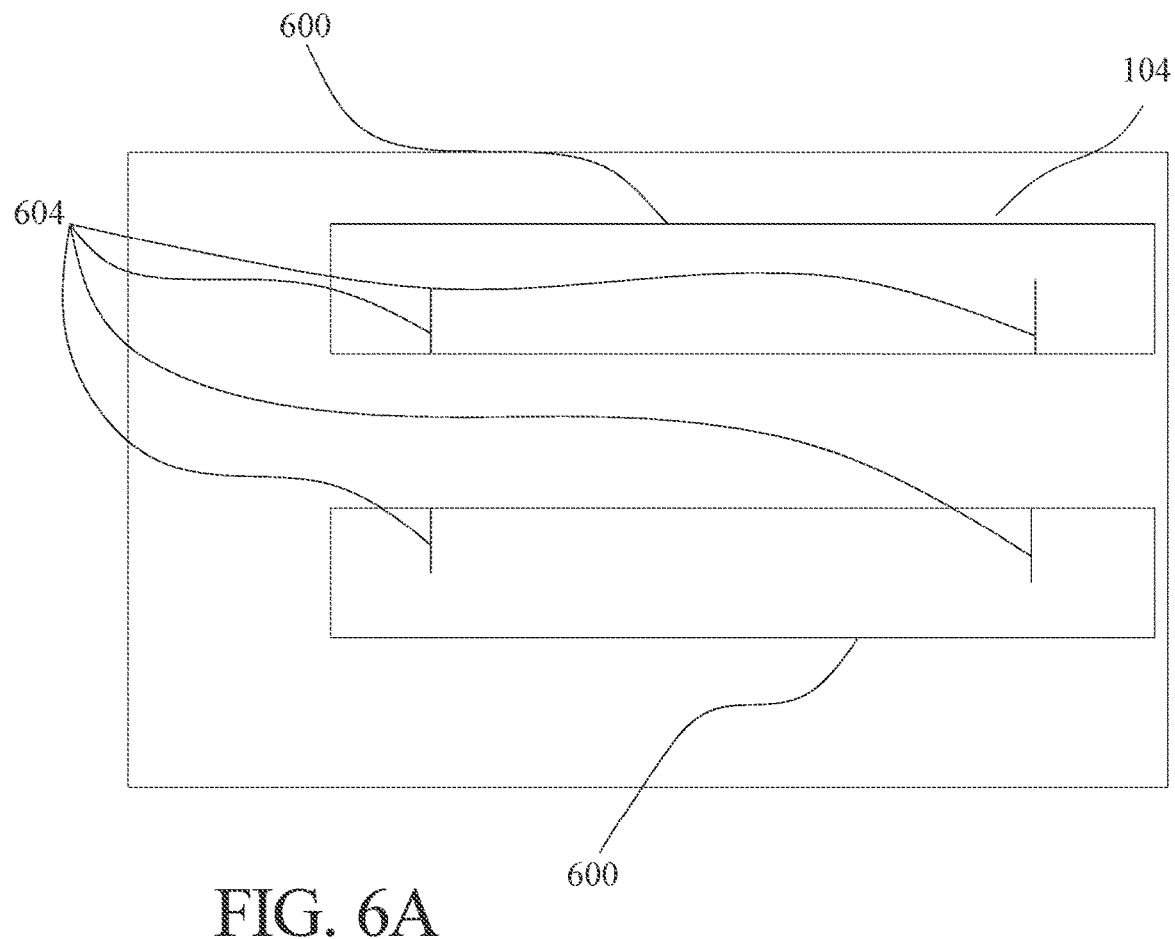
FIGS. 6A-C present an exemplary set of schematic views of a double-layered planar structure in an embodiment.
Figure 6B:
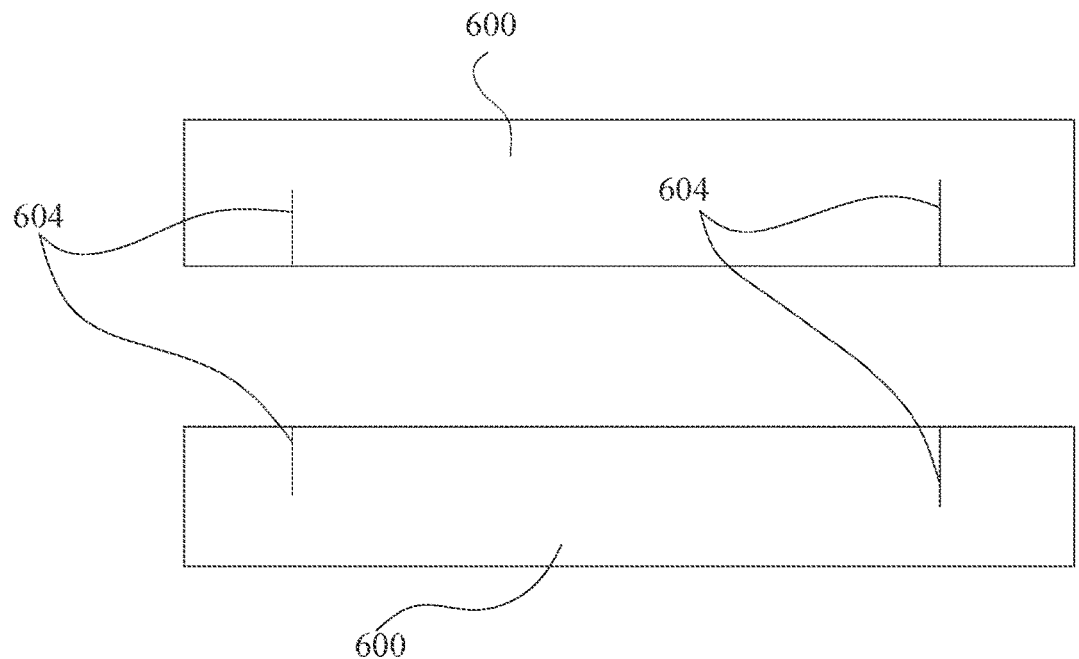
Figure 6C:
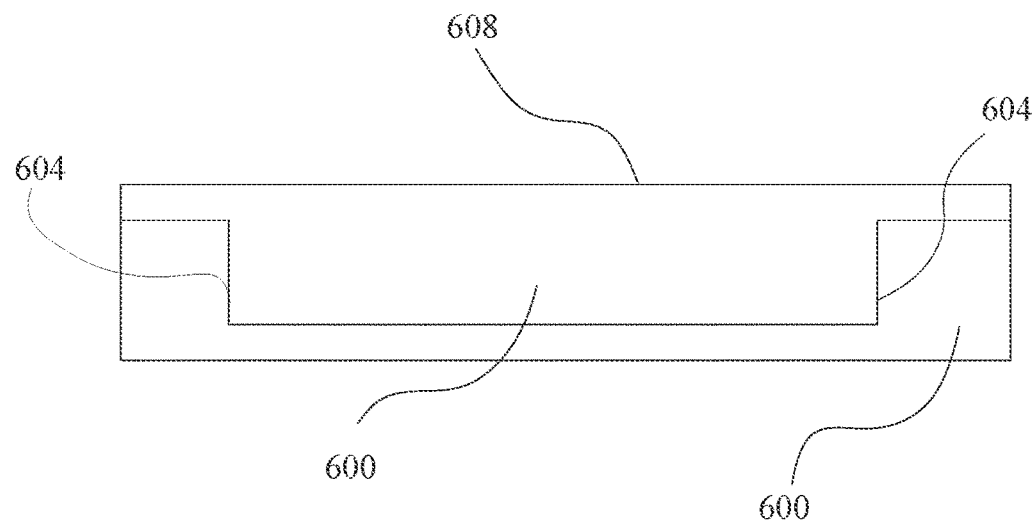

Referring now to FIGS. 6A-C, a linear fault region may define two or more detachable sections of overall surface 144 that combine in second configuration to form a double-layered planar feature. Two sections 600 may be defined in a portion of overall surface 144 such as base 104. Each of two sections 600 may have at least a mating feature 604; as shown here, mating features 604 may be reciprocal slots, but mating features 604 may be implemented as tab-and-slot combinations or any other mating feature as described above. Two sections 600 may be joined in an overlapping fashion by joining mating features 604, resulting in a double-layered planar structure 608; this may be used as a bracing component, platform, tray, ramp, structural wall, or other element described above. Although double-layered planar structures have been illustrated and described above for exemplary purposes, three or more layers may be used for some planar structures. Furthermore, multi-layered planar structures may have some areas that overlap to create multiple layers, while other areas remain single-layered.

Referring now to FIG. 7, a method 700 of manufacturing a dual-purpose container is illustrated. At step 705, a dual-purpose container in a first configuration is provided. Dual-purpose container may include a base. Base may be base 104 as described above; base may have a perimeter, upper surface, and lower surface as described above. Base 104 may have a first tensile strength as described above. Dual-purpose container may include a perimeter wall 120 having a lower edge, and interior surface, and an exterior surface; perimeter wall 120 may be any perimeter wall 120 as described above. Perimeter wall 120 has a second tensile strength, which may be second tensile strength as described above. Exterior surface, interior surface, upper surface, and lower surface together may form an overall surface.

Still viewing FIG. 7, at step 710 at least a first linear fault region is defined in the overall surface. At least a first linear fault region may include any at least a first linear fault region 148 as described above. Each first linear fault region of the at least a first linear fault region may define a curve on the overall surface, which may be any curve defined by any linear fault region as described above. At least a first linear fault region has a third tensile strength that is less than the first tensile strength and the second tensile strength, as described above in reference to FIGS. 1A-6C. At least a first linear fault region defines a first curve on the overall surface and a first mating feature; this may be implemented as described above in reference to FIGS. 1A-6C. Defining at least a first linear fault region may include depiction, projection, or pigmentation of one or more curves defined by at least a first linear fault region upon overall surface. Defining at least a first linear fault region may include weakening a portion of overall surface along linear fault region, for instance by perforating, scoring, or creasing along linear fault region.

Continuing to view FIG. 7, at step 715, a second mating feature is defined on the overall surface. Second mating feature may be defined according to any means or method described above for defining second mating feature.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Furthermore, the foregoing has been a detailed description of illustrative embodiments of the invention. It is noted that in the present specification and claims appended hereto, conjunctive language such as is used in the phrases "at least one of X, Y and Z" and "one or more of X, Y, and Z," unless specifically stated or indicated otherwise, shall be taken to mean that each item in the conjunctive list can be present in any number exclusive of every other item in the list or in any number in combination with any or all other item(s) in the conjunctive list, each of which may also be present in any number. Applying this general rule, the conjunctive phrases in the foregoing examples in which the conjunctive list consists of X, Y, and Z shall each encompass: one or more of X; one or more of Y; one or more of Z; one or more of X and one or more of Y; one or more of Y and one or more of Z; one or more of X and one or more of Z; and one or more of X, one or more of Y and one or more of Z.

Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A dual-purpose container and diversion device for animals, the dual purpose device comprising: a base having a perimeter, a lower surface and an upper surface, the base having a first tensile strength; a sidewall having a lower edge, an interior surface, and an exterior surface, wherein: the sidewall has a second tensile strength; the lower edge is attached to the perimeter of the base; the lower surface of the base and the exterior surface of the sidewall combine to define an outer surface of the dual-purpose device; the upper surface of the base and the interior surface of the sidewall combine to form an inner surface of the dual-purpose device; and the inner surface and the outer surface combine to form an overall surface of the dual-purpose device; at least a first linear fault region in the overall surface, wherein a first linear fault region of the at least a first linear fault region defines a first non-intersecting open curve on the overall surface, wherein: the first linear fault region has a third tensile strength; the third tensile strength is less than each of the first tensile strength and the second tensile strength; the first non-intersecting open curve includes a first extremum and a second extremum; and the first extremum and the second extremum identify a first linear section of the overall surface that is a part of the at least a first linear fault region; wherein the dual-purpose device is convertible from a first configuration to a second configuration, and wherein: the interior surface of the sidewall and upper surface of the base form an inner surface defining an interior compartment of the dual-purpose device in the first configuration; the dual-purpose device is transformed to a second configuration by fracture of the at least a first linear fault region and deformation of the overall surface along the first linear section to evert at least a planar section of the inner surface, the at least a planar section of the inner surface being opposite a corresponding at least a planar section of the outer surface; and the sidewall has at least a flap extending therefrom, the at least a flap being foldable to form a top of the dual-purpose device in the first configuration, the at least a flap extending from and forming an inclined section relative to the at least a planar section of the inner surface in the second configuration.

2. The dual-purpose device of claim 1, wherein the first linear section is substantially parallel to the base.

3. The dual-purpose device of claim 1, wherein the at least a first linear fault region further defines a first mating feature that engages at least one of the outer surface and the inner surface upon conversion to the second configuration.

4. The dual-purpose device of claim 3, wherein at least one of the outer surface and the inner surface further comprises a second linear fault region defining a second mating feature that joins the first mating feature upon conversion to the second configuration.

5. The dual-purpose device of claim 4, wherein the second mating feature further comprises an opening positioned to admit a portion of an edge defined by the at least a first linear fault region when the edge is rotated to contact the outer surface.

6. The dual-purpose device of claim 1, further comprising at least a second linear fault region in the overall surface, wherein:
the at least a second linear fault region has a fourth tensile strength; and
the fourth tensile strength is less than the first tensile strength and the second tensile strength.

7. The dual-purpose device of claim 6, wherein the at least a second linear fault region includes a complementary linear fault region that defines a non-intersecting open curve on the sidewall, wherein:
the open curve includes a third extremum and a fourth extremum; and
the third extremum and fourth extremum identify a second linear section of the overall surface that is not a part of the at least a second linear fault region.

8. The dual-purpose device of claim 7, wherein deformation of the overall surface along the second linear section causes an edge defined by the at least a second linear fault region to contact at least one of the at least a planar section of the inner surface and the at least a planar section of the outer surface.

9. The dual-purpose device of claim 7, wherein deformation of the overall surface along the second linear section causes an edge defined by the at least a second linear fault region to contact a surface on which the dual-purpose device is resting.

10. The dual-purpose device of claim 6, wherein the at least a second linear fault region includes a second linear fault region that defines a closed curve on the sidewall.

11. The dual-purpose device of claim 6 wherein the at least a second linear fault region defines a first mating feature and the at least a first linear fault region further defines a second mating feature positioned to join the first mating feature upon conversion to the second configuration.

12. The dual-purpose device of claim 6, wherein a second linear fault region of the at least a second linear fault region is defined in at least one of the at least a planar section of the outer surface and the at least a planar section of the inner surface.

13. The dual-purpose device of claim 1, wherein the first extremum is at a first endpoint of the first non-intersecting open curve.

14. The dual-purpose device of claim 13, wherein the second extremum is at a second endpoint of the first non-intersecting open curve.

15. The dual-purpose device of claim 14, wherein, at least in the first configuration, an entirety of the first linear section is spaced from each of the first endpoint and the second endpoint.

\* \* \* \* \*